US007870169B2

(12) United States Patent
Draper et al.

(10) Patent No.: US 7,870,169 B2
(45) Date of Patent: Jan. 11, 2011

(54) METHOD FOR ENABLING TRACEABILITY AND RECOVERY FROM ERRORS DURING MIGRATION OF SOFTWARE APPLICATIONS

(75) Inventors: Patrick J. Draper, Austin, TX (US); Kevin D. Galloway, Austin, TX (US); Jim Hyde, Pflugerville, TX (US); Ying Li, Beijing (CN); Liang Liu, Beijing (CN); Qian Ma, Beijing (CN); Krishna C. Ratakonda, Yorktown Heights, NY (US); Kewei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/770,788

(22) Filed: Jun. 29, 2007

(65) Prior Publication Data

US 2009/0006493 A1 Jan. 1, 2009

(51) Int. Cl.
*G06F 17/40* (2006.01)
(52) U.S. Cl. .................. 707/812; 707/967; 709/202; 711/202; 367/50; 367/73
(58) Field of Classification Search .......... 707/704, 707/812, 969; 709/202; 711/202; 367/50, 367/73
See application file for complete search history.

(56) References Cited

U.S. PATENT DOCUMENTS 5,475,834 A * 12/1995 Anglin et al. ............... 707/203
5,745,703 A *  4/1998 Cejtin et al. ............... 709/238
6,016,394 A *  1/2000 Walker ....................... 717/104
6,065,018 A *  5/2000 Beier et al. ................. 707/202
6,144,999 A * 11/2000 Khalidi et al. ............. 709/219
6,298,345 B1* 10/2001 Armstrong et al. ........... 707/8

(Continued)

FOREIGN PATENT DOCUMENTS

GB          2033699 A  *  5/1980

(Continued)

OTHER PUBLICATIONS

Manhoi Choy, Hong Va Leong, Man Hon Wong; Disaster recovery techniques for database systems, 2000, Communications of the ACM, vol. 43 , Issue 11, Retrieved from ACM digital library.*

(Continued)

*Primary Examiner*—Shahid A Alam
(74) *Attorney, Agent, or Firm*—Ryan, Mason & Lewis, LLP

(57) ABSTRACT

A method (which can be computer implemented) for addressing errors during migration of software applications includes the step of obtaining access to a data repository, which includes a listing of migration decisions and a listing of dependencies associated with the migration decisions. The method further includes the steps of obtaining an indication of a migration error, tracing the migration error to at least a first one of the migration decisions in the data repository, and employing the listing of dependencies to identify at least a second one of the migration decisions, depending on the at least first one of the migration decisions identified in the tracing step, which is impacted by the migration error. Techniques for populating the data repository are also provided.

18 Claims, 5 Drawing Sheets

U.S. PATENT DOCUMENTS

| | | | |
|---|---|---|---|
| 6,343,296 B1 * | 1/2002 | Lakhamraju et al. | 707/103 R |
| 6,539,396 B1 * | 3/2003 | Bowman-Amuah | 707/769 |
| 6,789,114 B1 * | 9/2004 | Garg et al. | 709/224 |
| 2005/0015414 A1 * | 1/2005 | Blea et al. | 707/203 |
| 2006/0015527 A1 * | 1/2006 | Dingle | 707/103 X |
| 2006/0047712 A1 * | 3/2006 | Shitomi et al. | 707/202 |
| 2007/0143352 A1 * | 6/2007 | Dunn et al. | 707/200 |

FOREIGN PATENT DOCUMENTS

| | | |
|---|---|---|
| WO | WO 02097664 A1 * | 12/2002 |
| WO | WO 2007024478 A2 * | 3/2007 |

OTHER PUBLICATIONS

HP-UX to Solaris Migration; Your infrastructure our business dated Sep. 2004; Downloaded from http://www sun com/solutions/documents/solution-sheets/hp_hpuxsolaris_ff xml?facet+−1 (1 of 6) Jun. 27, 2007.

Solaris: Tru_to_Solaris Migration Tool for C/C++ Source Code; downloaded from http://developers sun com/jsp_utils/PrintPagejsp?url=http%3 A%2F%2F developerssun com%2Fsolaris% .; Jun. 27, 2007.

Speedware, Division of Activant Solutions Inc.; "The End-to-End HP e3000 Migration Solutions Provider"; downloaded from http://www speedware com/solutions/HPe3000_migration/migration_tools/AMXW/product_description/ on Jun. 27, 2007.

Migration to Solaris OS x86, "Simplicity Today and Tomorrow", downloaded from http://partneradvantage sun.com/partners/migration/enterprise/solaris/x86 html on Jun. 25, 2007.

TransforMix Computer Corporation; Transport/UNIX, Fast, accurate COBOL migration from HP MPE/iX to UNIX; downloaded from http://www.xformix.com/xform/xformmf htm on Jun. 22, 2007.

Speedware; Migration Solutions, AMXW, "The One-Stop Solution for Automated Migration of 3GL Applications for HP e3000 Customers".

Sun Microsystems, Inc.; Migration Options, Chapter 1-3, Solaris OS Analyzer for C/C++ and COBOL Source Code—version 1.2.1 (formerly J Score).

* cited by examiner

METHOD FOR ENABLING TRACEABILITY AND RECOVERY FROM ERRORS DURING MIGRATION OF SOFTWARE APPLICATIONS

FIELD OF THE INVENTION

The present invention relates to the electrical, electronic, and computer arts, and, more particularly, to migration of software applications.

BACKGROUND OF THE INVENTION

The increasing size and complexity of the information technology (IT) needs of businesses force periodic upgrade of their IT infrastructures—in this context, software applications ranging from operating systems, middleware and end-user applications need to be migrated. The process associated with migration may range from simple to complex, depending on the number of elements which change during the upgrade—the most complex being a change in both the hardware and the type of operating system. Such a change typically necessitates a complete rebuilding of the middleware and end-user application stack to support the same business functions on the new platform.

Many tools exist that can assist in the migration process—from capturing the information on the old system, to automated analysis, provisioning and configuration of the new platform. However, most such tools help automate individual migration tasks, but leave significant gaps when approaching a typical server consolidation scenario, where the business is trying to simultaneously replace hundreds or even thousands of potentially geographically distributed servers. A seemingly trivial mis-step in the migration process may result in costly outages. However, given the complexity of the process of migration and the unknowns in terms of software compatibility and other factors, such mistakes may be unavoidable with current techniques.

Current techniques include Solaris™ migration tools for migrating from HPUX and HPTru64. Such tools are aimed at simplifying the migration process and reducing porting time. Examples of such tools include: (i) Solaris® (registered mark of Sun Microsystems, Inc. of Santa Clara, Calif.) operating system software OE analyzer for application/code migration, (ii) AMXW for automatically potting HP e3000 applications to UNIX platforms including Solaris® (registered mark of Sun Microsystems, Inc. of Santa Clara, Calif.) operating system software OS, and (iii) Transformix™ (mark of Transformix Computer Corporation of San Diego, Calif.) migration software for allowing migration of MPE/iX COBOL II applications to UNIX or Linux® (registered mark of Linus Torvalds of Portland, Oreg.) operating system software. However, these tools do not provide an over-arching consistent migration platform for tracking migration decisions that flow across the platforms—for example, mis-configuring a network adapter may also have collateral impact on the ability to access a database. Thus, addressing one migration problem requires an understanding of the migration decisions made over a period of time across multiple disparate applications—such coordination is not available in the state of the art tools available to practitioners.

It would be desirable to overcome the limitations in previous approaches.

SUMMARY OF THE INVENTION

Principles of the present invention provide techniques for enabling traceability and recovery from errors during migration of software applications. In one aspect, an exemplary method (which can be computer implemented) for addressing errors during migration of software applications includes the step of obtaining access to a data repository. The data repository includes a listing of migration decisions and a listing of dependencies associated with the migration decisions. The method further includes the steps of obtaining an indication of a migration error, and tracing the migration error to at least a first one of the migration decisions in the data repository. Yet further, the method includes the step of employing the listing of dependencies to identify at least a second one of the migration decisions, depending on the at least first one of the migration decisions identified in the tracing step, which is impacted by the migration error.

Preferably, an additional step includes repeating the employing step to identify a set of the migration decisions impacted by the migration error, and the listing of dependencies is organized as a tree or graph structure.

In another aspect, an exemplary method of obtaining a listing of dependencies associated with a listing of migration decisions includes the steps of obtaining as-is system information, obtaining to-be system information, mapping the as-is and to-be system information to a centralized model, and implicitly capturing at least some of the listing of dependencies associated with the migration decisions via design of the model. This method can be performed independently or together with the above-discussed method, and can be used to obtain appropriate information for the aforementioned data repository.

One or more embodiments of the invention may provide one or more benefits. For example, if a printer is mis-configured, resulting in the inability to print from a given server, the problem can be quickly fixed with a high degree of certainty if the mistake can be traced back to a faulty migration decision. Such traceability enables the administrator to not only fix that particular mistake, but also to identify other printers which may also be mis-configured, both within the context of the same server and across the collection of servers being migrated. Further, one or more embodiments of the invention may provide techniques for enabling traceability and full or partial automated recovery from migration errors, as well as a unified approach to address one or more of the following problems collectively:

1. How do we enable tracing of migration problems to particular migration decisions?
2. How do we identify dependencies between migration decisions so that we can delineate the set of migration decisions that need to be treated as a unit for addressing a migration problem?
3. Once a set of faulty migration decisions are identified, how can we partially roll back and re-do the migration process while guaranteeing that other unrelated elements are not affected?
4. How do we address these problems in the context of a situation where the target systems have a completely different configuration compared to the source machines—for example, migrating multiple source servers onto a logically partitioned, symmetric multi-processing (SMP) machine?

One or more embodiments of the invention of elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps.

These and other features, aspects, and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments of the invention provide end-to-end traceability of the migration process with the ability to review the migration history for individual elements. Fixing mistakes typically involves identifying other related elements which may be affected within the same server or across multiple servers involved in a large project—for example, a server consolidation project. Systematic capture of the migration decisions in a manner that they can be automatically or semi-automatically "rolled back" advantageously aids quick recovery.

One significant aspect of one or more embodiments of the invention is a centralized model that captures both the configuration parameters and migration decisions. The model may also provide the ability to capture the relationships and dependencies between these model elements. Note that these relationships are typically not simple one-to-one relationships, as the same configuration parameter in conjunction with other parameters may result in multiple decisions ranging from provisioning, to system configuration, to application migration. These relationships typically form decision clusters which span multiple servers and potentially multiple migration tools. In a significant departure from existing systems, one or more embodiments of the inventive model capture these relationships all through the migration process. These models, in conjunction with migration logs that capture the transformations that took place during the migration process in a linear timeline, provide the underlying foundation for enabling traceability, in one or more embodiments of the invention.

Another significant aspect of one or more embodiments of the invention is the ability to "roll back," either partially or filly, parts of the migration process, so as to enable recovery from mistakes. Roll back typically requires careful book-keeping and ensuring that each migration decision has an associated method for undoing it. In one or more embodiments, the traceability model described herein plays an important role in enabling partial roll-back, since it preferably provides a dependency graph between decisions, and can therefore help identify groups of decisions that can be rolled back as a unit.

Figure 1:
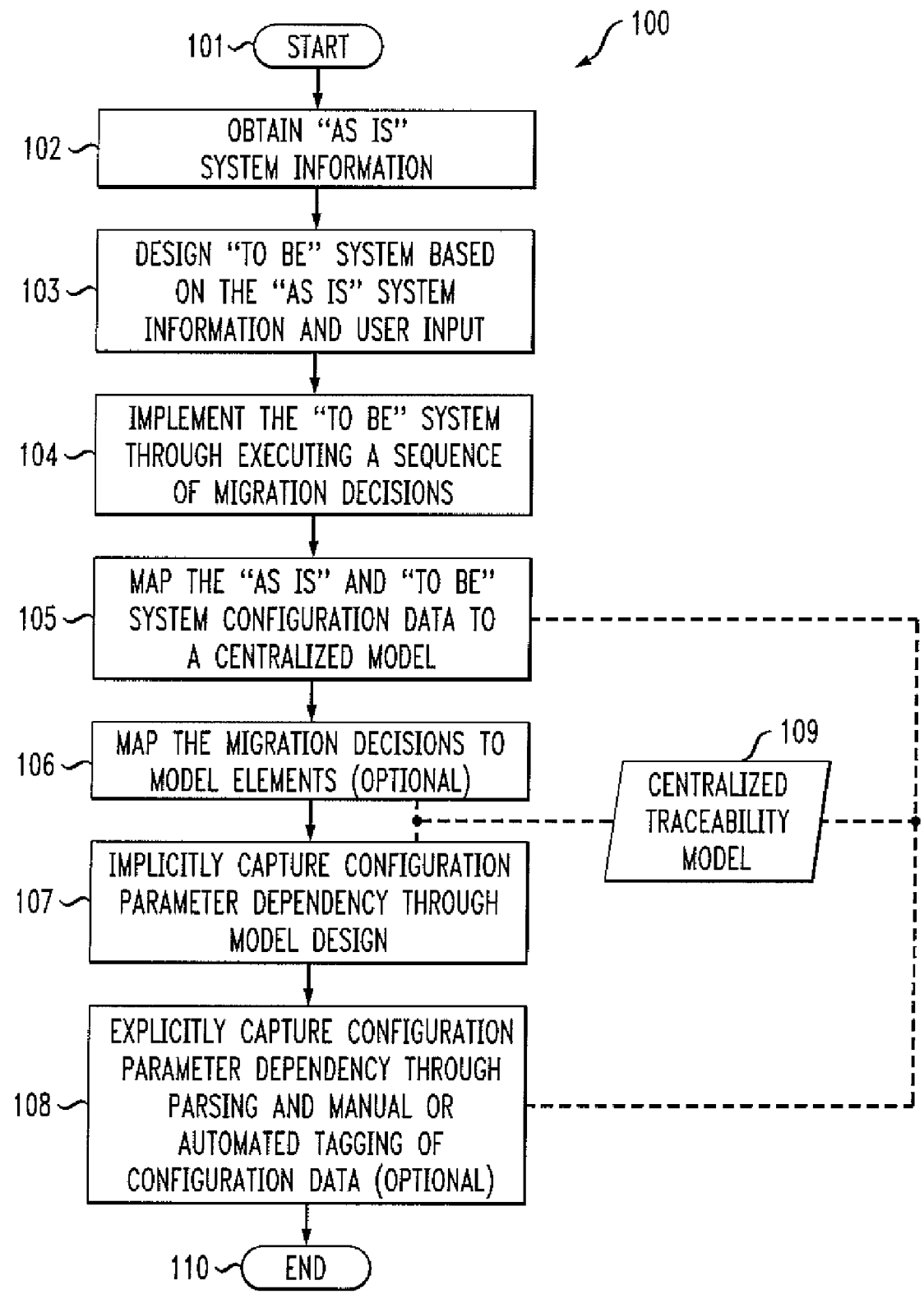
FIG. 1 illustrates a flow chart describing the construction of a centralized model used for traceability, according to an aspect of the invention.

Attention should now be given to FIG. 1, which shows a flow chart 100 of exemplary method steps for one method of constructing the aforementioned traceability model. After starting at block 101, "as-is" system information is obtained at block 102, and the "to-be" system is designed based on the "as-is" system, as at block 103. The design can be based, for example, on the information obtained in block 101, and/or user input. In block 104, the "to be" system is implemented by executing a sequence of migration decisions. In block 105, the configuration data of both the "as is" and "to be" systems is mapped to a centralized model For the "as is" system, the information may be captured, for example, through use of an automated tool. For the "to be" system the information may be obtained, for example, through a translation mechanism and user input. Optionally, the migration decisions can be mapped to model elements, as at block 106.

In general, it is appropriate to capture dependencies between model elements; dependencies between model elements are implicitly (for example, by model design) or explicitly (for example, through parsing and tagging captured configuration parameters) maintained within the model. Block 107 depicts the aforementioned implicit capture of configuration model dependency through model design. Block 108 depicts the (optional) explicit capture of configuration parameter dependency though the aforementioned parsing and manual or automated tagging of configuration data. Thus, migration decisions are advantageously logged and captured with appropriate dependencies to the model and other migration decisions as they occur. The resulting centralized traceability model is depicted as block 109 Processing ends at block 110.

Once a traceability model 109 is constructed, in one or moire embodiments, it can be used, for example, to (i) identify a cluster of inter-dependent configuration parameters and/or migration decisions that need to be tackled as a unit (model-based dependency tracking can help identify and tackle these migration clusters as single units avoiding cross-tool migration errors), and/or (ii) enable planning of "what if" migration change scenarios through comparison of the "as is" and "to be" systems.

In view of the above description of FIG. 1, it will be appreciated that an exemplary method of obtaining a listing of dependencies associated with a listing of migration decisions, according to an aspect of the invention, can include the steps of obtaining as-is system information, as per block 102, and obtaining to-be system information (for example, by designing to-be system and implementing it by executing migration decisions), as per blocks 103 and 104. Further steps can include mapping the as-is and to-be system information to a centralized model, as per block 105, and implicitly capturing at least some of the listing of dependencies associated with the migration decisions via design of the model, as per block 107. Optionally, the method can include the additional step of mapping the migration decisions to a plurality of model elements, as per block 106. Another optional step includes explicitly capturing at least some of the listing of dependencies associated with the migration decisions, as per block 108.

Figure 2:
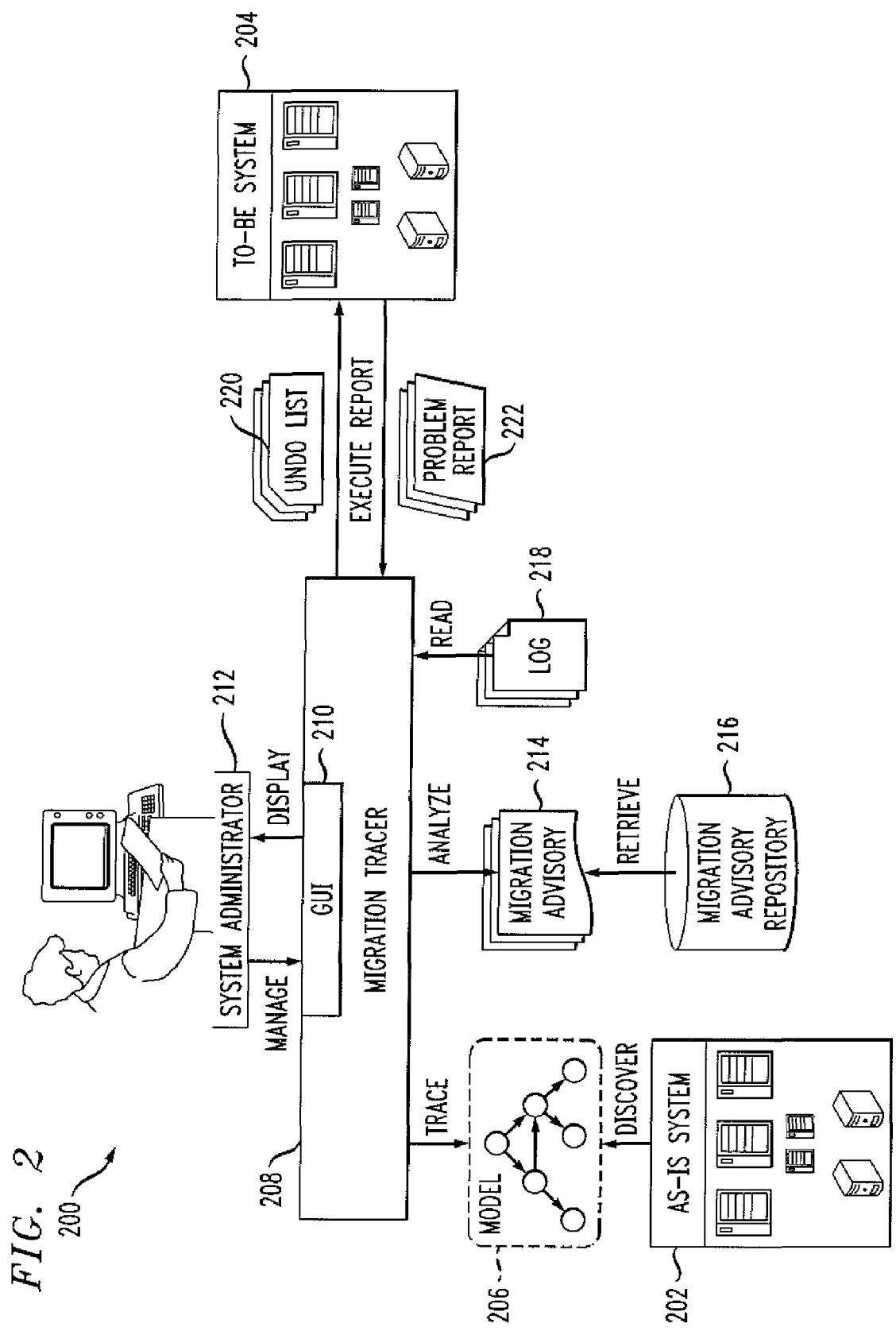
FIG. 2 illustrates a system according to another aspect of the invention.

One or more embodiments of the invention provide a method and apparatus for enabling the traceability and fall or partial automated recovery mechanism when some mistakes happen after system migration. A preferred system-level embodiment 200 of the invention is illustrated in FIG. 2.

System 200 includes an executable utility 208, referred to herein as a "Migration Tracer." The migration tracer 208 acts as a problem dealer, which provides traceability of the migration process, with the ability to review the migration history for individual elements. First, it will receive the problem report 222 from the new system environment 204, and then locate the problematic element in a centralized configuration model 206 which describes the relationship and dependency between configuration elements. Second, the tracer 208 will retrieve the correspondent migration advisory 214 from an advisory repository 216 according to the above problematic element. A migration advisory describes the mapping for a given configuration element from the old system environment 202 to the new one 204.

Third, the migration tracer 208 will display the advisory detail to the system administrator 212 via the graphical user interface (GUI) 210, and let the administrator analyze whether one or more mis-configurations exist in the advisory 214. If there is not anything wrong with the advisory of the current configuration element, the migration tracer 208 will trace back to the element which the problematic element depends on, and then ascertain whether it is mis-configured. The trace process can be repeated until the root cause of the mistake has been found. For instance, given that a printer cannot work normally after migration, the migration tracer will check the self-configuration of that printer at first. If no problem is found in the printer configuration, the tracer will diagnose the services relied on by the printer; such as the network configuration. The tracer may check the Dynamic Host Configuration Protocol (DHCP) service to see if the printer is assigned a correct Internet Protocol (IP) address.

When the root cause is identified, the migration tracer 208 can analyze the suspicious mis-configured range, since other elements depending on the root cause are also error prone, both within the context of the same server and across the collection of servers being migrated. The list of suspicious elements can be sent, via an alarm, to the system administrator. The migration tracer 208 will undo the corresponding migration decision (as per undo list 220) in accordance with the migration log 218. Once this roll-back process finishes successfully the system administrator 212 can modify the wrong migration decisions and start a new migration. If no problem is reported after the new migration, the tracer 208 will update the migration advisory repository 216. In the preferred embodiment, the migration tracer 208 includes the aforementioned GUI interface 210 for outputting related traceability information to the system administrator 212, and for allowing the system administrator 212 to manage the trace process and roll-back process manually, especially with regard to modifying the error migration advisory 214.

As noted, one significant component in one or more embodiments of the present invention is a centralized model, such as elements 109 in FIG. 1 and 206 in FIG. 2, which captures the software resource configurations and their relationship. Note that the relationships are typically not simple one-to-one relationships. The same configuration parameter in conjunction with other parameters may result in different migration decisions. In the preferred embodiment, the relationships in the model are described as first-class entities, to support different kinds of relationships. The configuration value in the old system environment is discovered by a discovery tool, and filled into the related fields in the model to generate a model instance. The migration tracer 208 utilizes this model to retrieve the appropriate migration advisory 214 for a configuration element. During the roll-back process, the trace path in the model is used to define the range of the elements that need to be undone. A trace path, as used herein, means a path from the initial problematic element to the root cause in the model 109, 206.

According to the preferred embodiment, the configuration model should be independent of the specific systems or applications, so configuration settings collected by the discovery tool from different application environments are able to be mapped into a uniform data-representing format. Furthermore, using a system-neutral configuration model is convenient, in order to develop the transformation rules from the source settings to the target ones. Although the present invention is not limited to any specific modeling technique, the Common Information Model (CIM) is a preferred modeling technique. CIM provides a common meta-model to define the common concepts and semantics of the managed elements, and additionally supports extension mechanisms to describe the specific managed elements for, particular platforms.

Figure 3:
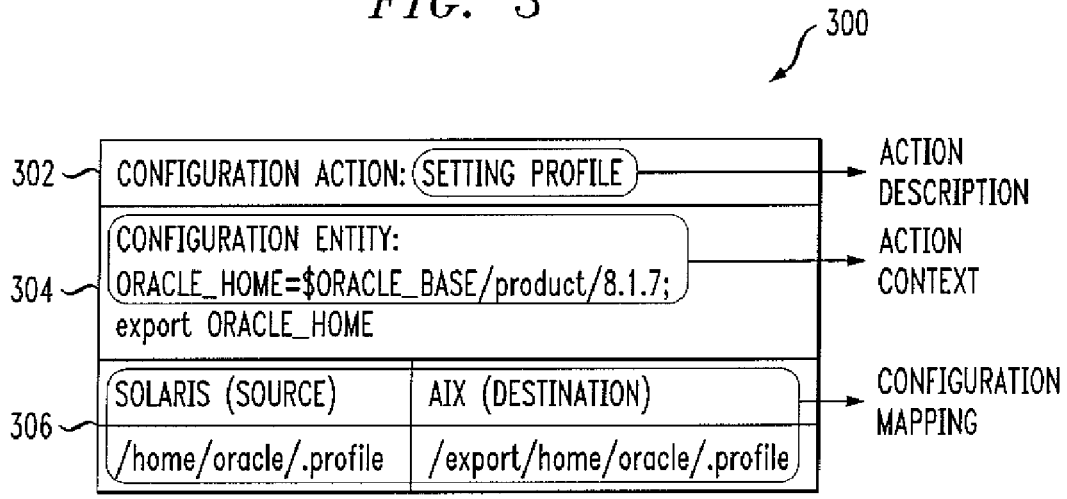
FIG. 3 presents an exemplary migration advisory, according to still another aspect of the invention.

Another significant aspect of one or more embodiments of the present invention is the migration advisory repository 214, which preferably stores all kinds of advisories for configuration elements. A migration advisory is a configuration settings mapping from the old system environment 202 to the new system environment 204. The advisory is usually asserted by the domain expert or according to the related migration handbook FIG. 3 illustrates a sample of a configuration setting migration advisory 300, including action description 302, action context 304, and configuration mapping 306. In the migration process, the system administrator 212 migrates a configuration element according to its migration advisory 214. Furthermore, the administrator 212 would check an element's advisory if the element reports some errors after migration, and meanwhile the administrator 212 can refer to the advisory 214 to generate the undo action(s) 220 in the roll-back process. The migration advisory should preferably be updated by the system administrator 212 if some problems are detected in the trace process.

Yet another significant feature of one or more embodiments of the present invention is the enabling of the new system environment to roll back, when mistakes happen after migration. Under many situations, roll-back needs careful analyzing and restoring. In accordance with one or mote embodiments of the invention, the migration tracer 208 can leverage the centralized configuration model 109, 206 to find an appropriate trace path for roll-back. Advantageously, it will read the migration log conversely (that is, in reverse chronological order) and retrieve the part about the problematic migration actions according to the migration advisory of the element in the above trace path. After that, some undo actions can be reasoned out by the migration tracer or another external utility. The system administrator 212 can also be involved in the roll-back process, to customize the undo action(s), since restoring some configuration settings may have an effect on other settings that have a relationship with them. Progress of the roll-back is preferably displayed to the system administrator 212 though the GUI 210. After rolling back to the original state, the system administrator 212 can re-migrate again under a new strategy, and update the correspondent advisories in the repository.

Figure 4:
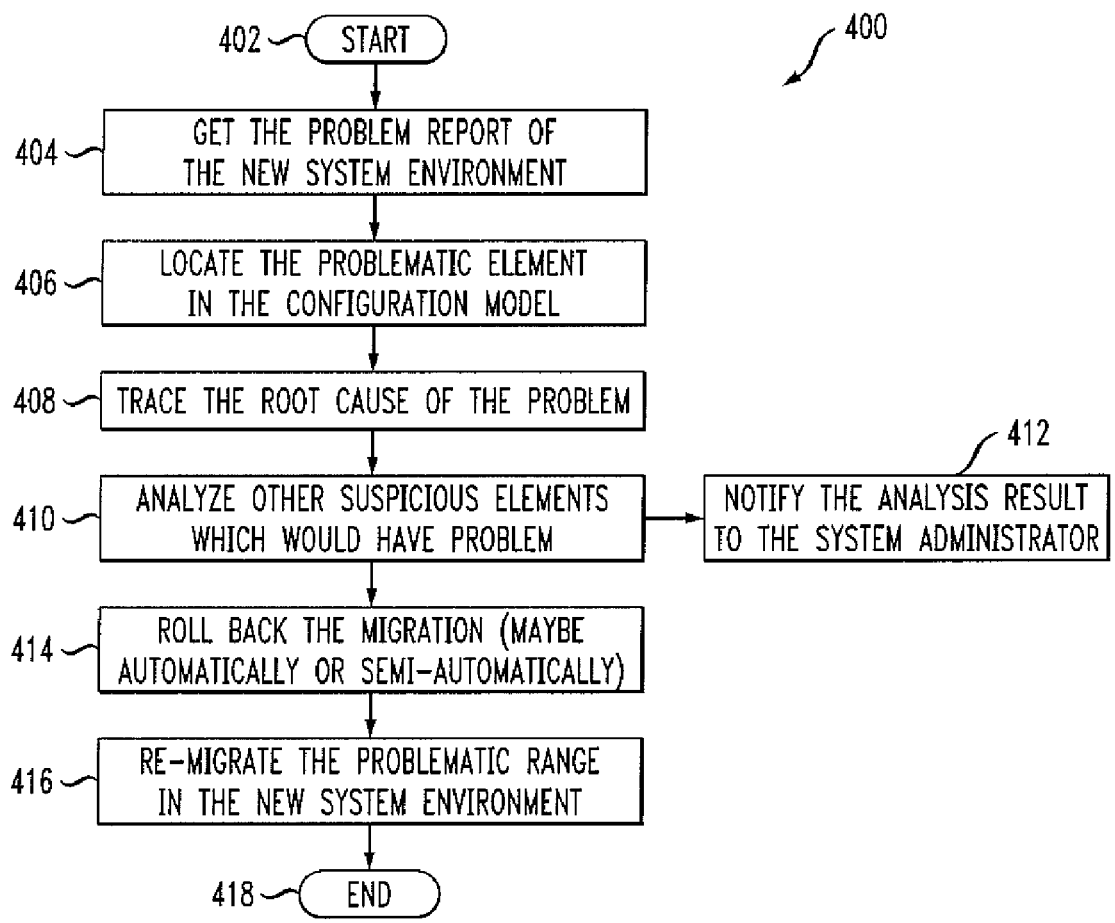
FIG. 4 illustrates a flow chart of exemplary method steps, according to yet another aspect of the invention.

Attention should now be given to FIG. 4 and flow chart 400 thereof, which depicts an exemplary main process flow for traceability and roll back, in accordance with an aspect of the invention. Thus, after beginning at block 402, an exemplary inventive method for addressing errors during migration of software applications includes the step of obtaining access to a data repository, such as that obtained in connection with the process of FIG. 1. The data repository includes a listing of migration decisions and a listing of dependencies associated with the migration decisions. At block 404, an indication of a migration error is obtained. In steps, 406 and 408, the migration error is traced to at least a first one of the migration decisions in the data repository, by locating the problematic element in the configuration model at 406 and tracing the root cause of the problem at 408.

In steps 410 and 412, the listing of dependencies is employed to identify at least a second one of the migration decisions, depending on the at least first one of the migration decisions identified in the tracing step, which is impacted by the migration error. The analysis of other suspicious elements which could have a problem occur's at block 410, and the system administrator is preferably notified of same, as at block 412. Preferably, the employing step (that is, block 410) is repeated to identify a set of the migration decisions impacted by the migration error. The listing of dependencies is preferably organized as a tree or graph structure.

In some instances, the data repository further comprises a listing of loll-back actions to be taken to roll back the migration decisions, for example, the undo list 220 of FIG. 2. An additional step 414 can be carried out, namely, identifying at least one particular one of the toll-back actions to be taken, based on the first and second migration decisions. The migration can be rolled back, fox example, automatically or semi-automatically. Yet further, an additional step 416 can include re-doing a problematic set of migration decisions corresponding to the at least one particular one of the roll-back actions, that is, to re-migrate the problematic range in the new system environment. Processing ends at block 418.

The method of FIG. 4 can also include the additional step of creating the data repository, for example, by carrying out the techniques described with regard to FIG. 1.

Figure 5:
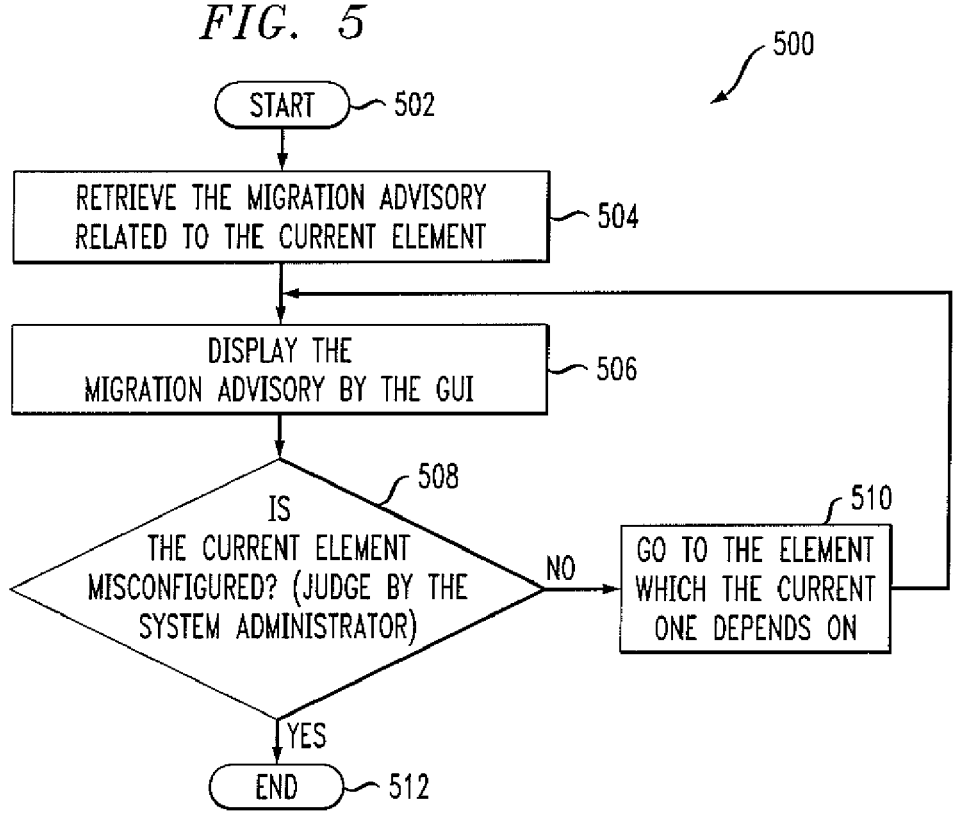
FIG. 5 illustrates a detailed process flow for tracing a toot cause, according to a further aspect of the invention.

FIG. 5 shows an exemplary detailed process flow 500 of tracing the root cause. Note that the aforementioned dependencies are associated with elements. After beginning at block 502, we see that the tracing step 408 of FIG. 4 can include, for example, retrieving a migration advisory related to a current element under analysis, as per block 504, and facilitating display of the migration advisory, for example via the GUI, as per block 506. As used herein, including the claims, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

Further, at block 508, a determination can be made whether the current element is mis-configured (the determination can be made, for example, by the system administrator). As per the "NO" branch of decision block 508, responsive to the determination that the current element is not mis-configured, the step 506 of facilitating display can be repeated for an element upon which the current element depends, as per block 510. As per the "YES" branch, if the current element is mis-configured, presumably the root cause has been found, and processing ends at block 512.

Figure 6:
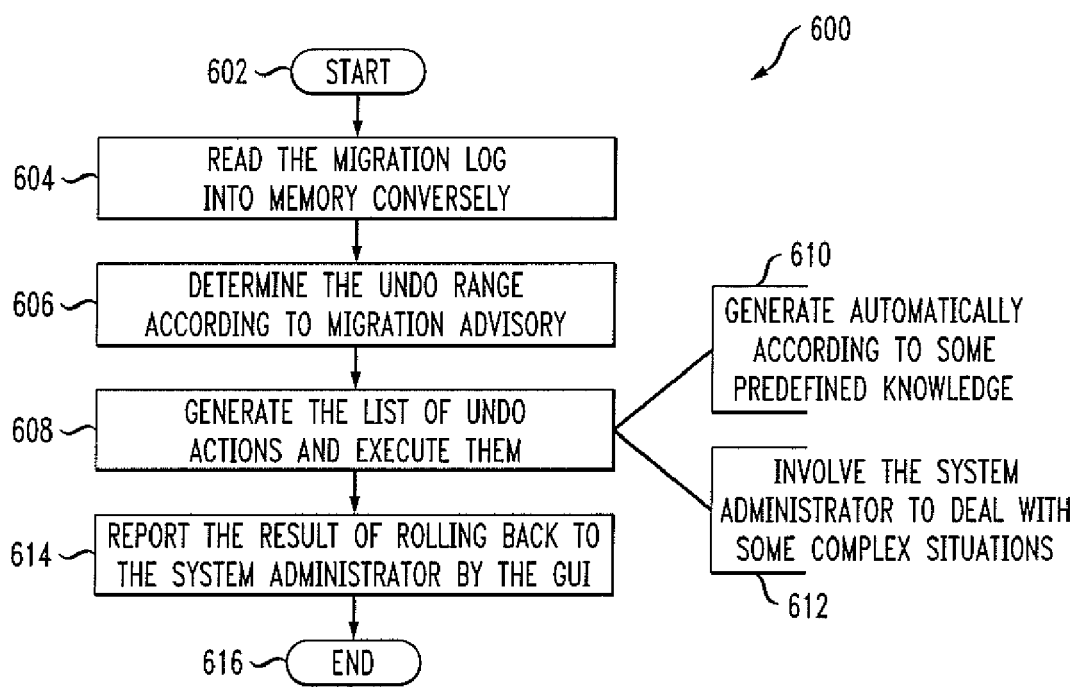
FIG. 6 illustrates a detailed process flow of roll-back, according to still a further aspect of the invention.

FIG. 6 shows an exemplary detailed process flow 600 of roll back. It should be noted that in one Or more embodiments, the dependencies are stored in the data repository as a directed dependency graph capturing a sequence in which given ones of the roll-back actions need to be performed to ensure correct roll back in a given desired case. Thus, after beginning at block 602, we see that the roll back step 414 of FIG. 4 can include, for example, accessing a migration log 218 in a converse order, as per block 604, and determining an undo range according to a migration advisory, as per block 606, based on the accessing of the migration log. As noted "converse" order refers to reverse chronological order. It should also be noted that an "undo range" is intended to encompass a continuous range of steps or a discrete step or steps, or some combination thereof. Additional steps can include generating a list with the at least one roll-back action, based on the determining of the undo range, and executing the at least one roll back action, as at block 608.

As indicated at 610, the step 608 of generating the list can be accomplished by automatic generation according to some pie-defined knowledge, for example, via an undo script. In addition or alternatively, as pet 612, the step 608 of generating the list can be facilitated, at least in part, by involving a human system administrator, for example, to deal with more complex situations. Reporting results of the roll back to the system administrator can occur at block 614, for example, via the GUI Processing ends at block 616. Thus, in one or more embodiments, the data repository includes a listing 220 of actions to be taken to roll back the migration decisions, and as-is system parameters 202 mapped to to-be system parameters 204, and step 414 of FIG. 4 can include employing the mapping to simulate a recovery scenario, as just described with regard to FIG. 6.

Figure 7:
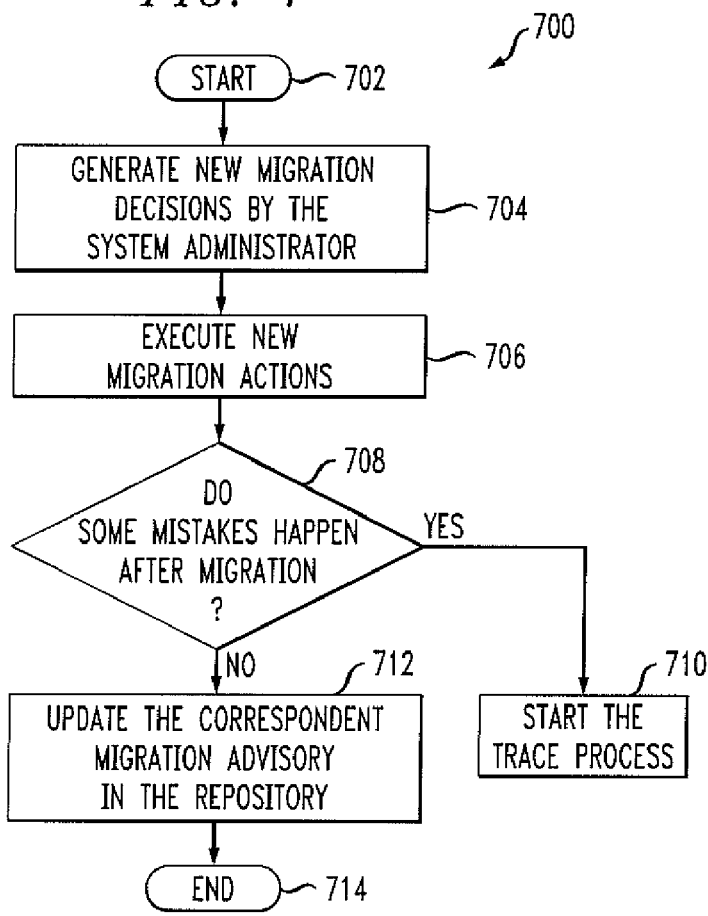
FIG. 7 illustrates a detailed process flow of a new migration, according to yet a hither aspect of the invention.

FIG. 7 shows an exemplary detailed process flow 700 of new migration. Thus, after beginning at block 702, we see that the re-migration step 416 of FIG. 4 can include, for example, generating a set of re-do migration decisions, as per step 704, executing the re-do migration decisions, as per step 706, and making a determination whether at least one error occurs after executing the re-do migration decisions, as per decision block 708. As per "YES" branch of decision block 708, responsive to a determination that at least one error occurs after executing the re-do migration decisions, the tracing step can be repeated based on the re-do migration decisions, as per block 710. Where no errors occur after executing the re-do migration decisions, as per the "NO" branch of block 708, step 712 includes updating a corresponding migration advisory in the repository based on the re-do migration decisions. Processing ends at block 714.

It should be noted that in one non-limiting example, one or more of the methods set forth herein are performed, at least in part, as services, by a service provider for a client. Further, in one or more instances, at least some of the software applications undergoing the migration are applications of a third party other than the service provider and the client.

Exemplar System and Article of Manufacture Details

A variety of techniques, utilizing dedicated hardware, general purpose processors, firmware, software, or a combination of the foregoing may be employed to implement the present invention or components thereof One or more embodiments of the invention, or elements thereof, can be implemented in the form of a computer product including a computer usable medium with computer usable program code for performing the method steps indicated. Furthermore, one or more embodiments of the invention, or elements thereof can be implemented in the form of an apparatus including a memory and at least one processor that is coupled to the memory and operative to perform exemplary method steps.

Figure 8:
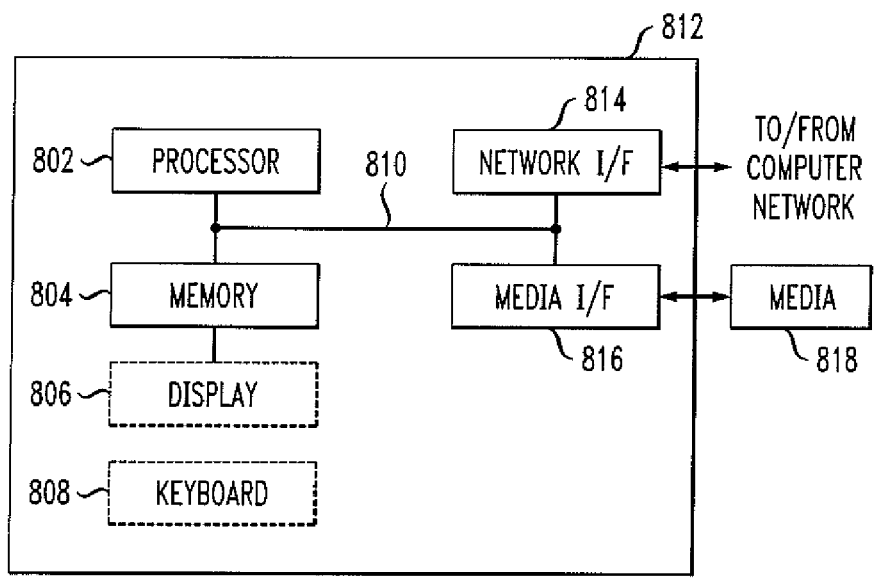
FIG. 8 depicts a computer system that may be useful in implementing one or more aspects and/or elements of the present invention.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit)

and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one ox mote of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 804), magnetic tape, a removable computer diskette (for example media 818), a random access memory (RAM), a read-only memory (ROM), a rigid magnetic disk and an optical disk. Current examples of optical disks include compact disk-read only memory (CD-ROM), compact disk-read/write (CD-RAW) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 808, displays 806, pointing devices, and the like) can be coupled to the system either directly (such as via bus 810) or though intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for addressing errors during migration of software applications, said method comprising the steps of:
   providing a system, wherein said system comprises a memory, at least one hardware processor coupled to said memory, a first distinct software module loadable into said memory and executable on said at least one hardware processor, a second distinct software module loadable into said memory and executable on said at least one hardware processor and a third distinct software module loadable into said memory and executable on said at least one hardware processor;
   obtaining access to a data repository, wherein said obtaining access step is carried out by said first distinct software module executing on said at least one hardware processor, said data repository comprising:
      a listing of migration decisions; and
      a listing of dependencies associated with said migration decisions;
   obtaining an indication of an existing migration error, wherein said obtaining said indication step is carried out by said second distinct software module executing on said at least one hardware processor;
   tracing said existing migration error to at least a first one of said migration decisions in said data repository, wherein said tracing step is carried out by said third distinct software module executing on said at least one hardware processor; and
   employing said listing of dependencies to identify at least a second one of said migration decisions, depending on said at least first one of said migration decisions identified in said tracing step, which is impacted by said migration error, wherein said employing step is carried out by said third distinct software module executing on said at least one hardware processor.

2. The method of claim 1, further comprising the additional step of repeating said employing step to identify a set of said migration decisions impacted by said existing migration error.

3. The method of claim 2, wherein said listing of dependencies is organized as one of a tree structure and a graph structure.

4. The method of claim 1, wherein said data repository further comprises a listing of roll-back actions to be taken to roll back said migration decisions, further comprising the additional step of identifying at least one particular one of said roll-back actions to be taken, based on said first and second migration decisions.

5. The method of claim 4, further comprising the additional step of re-doing a problematic set of migration decisions corresponding to said at least one particular one of said roll-back actions.

6. The method of claim 5, wherein said re-doing step in turn comprises:
  generating a set of re-do migration decisions;
  executing said re-do migration decisions; and
  responsive to a determination that at least one error occurs after executing said re-do migration decisions, repeating said tracing step based on said re-do migration decisions.

7. The method of claim 5, wherein said re-doing step in turn comprises:
  generating a set of re-do migration decisions;
  executing said re-do migration decisions; and
  responsive to a determination that no errors occur after executing said re-do migration decisions, updating a corresponding migration advisory in said repository based on said re-do migration decisions.

8. The method of claim 4, wherein said dependencies are stored in said data repository as a directed dependency graph capturing a sequence in which given ones of said roll-back actions need to be performed to ensure correct roll back in a given desired case.

9. The method of claim 4, wherein said step of identifying said at least one particular one of said roll-back actions to be taken comprises:
  accessing a migration log in a converse order;
  determining an undo range according to a migration advisory, based on said accessing of said migration log; and
  generating a list with said at least one roll-back action, based on said determining of said undo range;
  further comprising the additional step of executing said at least one roll back action.

10. The method of claim 9, wherein said step of generating said list comprises at least automatic generation via an undo script.

11. The method of claim 9, wherein said step of generating said list is facilitated, at least in part, by a human system administrator.

12. The method of claim 1, wherein said data repository further comprises:
  a listing of actions to be taken to roll back said migration decisions; and
  as-is system parameters mapped to to-be system parameters;
  further comprising the additional step of employing said mapping to simulate a recovery scenario.

13. The method of claim 1, wherein said steps are performed, at least in part, by a service provider for a client, and wherein at least some of said software applications undergoing said migration are applications of a third party other than said service provider and said client.

14. The method of claim 1, wherein:
  said dependencies are associated with elements; and
  said tracing step comprises at least:
    retrieving a migration advisory related to a current element under analysis;
    facilitating display of said migration advisory; and
    responsive to a determination that said current element is not mis-configured, repeating said step of facilitating display for an element upon which said current element depends.

15. The method of claim 1, further comprising the additional step of creating said data repository, said creating in turn comprising:
  obtaining as-is system information;
  obtaining to-be system information;
  mapping said as-is and to-be system information to a centralized model; and
  implicitly capturing at least some of said listing of dependencies associated with said migration decisions via design of said model.

16. The method of claim 15, further comprising the additional step of mapping said migration decisions to a plurality of model elements.

17. The method of claim 15, further comprising the additional step of explicitly capturing at least some of said listing of dependencies associated with said migration decisions.

18. A computer program product comprising a tangible computer readable recordable storage medium including computer usable program code for addressing errors during migration of software applications, said computer program product including:
  computer usable program code for obtaining access to a data repository, said data repository comprising:
    a listing of migration decisions; and
    a listing of dependencies associated with said migration decisions;
  computer usable program code for obtaining an indication of an existing migration error;
  computer usable program code for tracing said existing migration error to at least a first one of said migration decisions in said data repository;
  computer usable program code for employing said listing of dependencies to identify at least a second one of said migration decisions, depending on said at least first one of said migration decisions identified in said tracing step, which is impacted by said migration error; and
  computer usable program code for providing an identification of said first one of said migration decisions and said second one of said migration decisions.

* * * * *